April 26, 1949. T. DE FOREST 2,468,656
METHOD OF LAMINATING
Filed Nov. 5, 1945
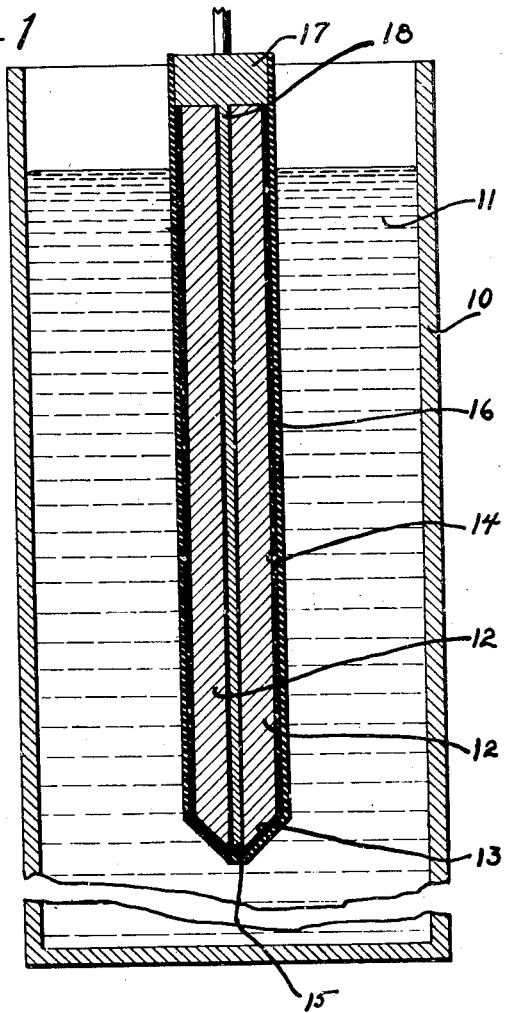
Inventor
TABER DEFOREST Patented Apr. 26, 1949

2,468,656

UNITED STATES PATENT OFFICE 2,468,656

METHOD OF LAMINATING

Taber de Forest, Northbrook, Ill.

Application November 5, 1945, Serial No. 626,711

4 Claims. (Cl. 154—110)

This invention relates to a method of laminating, and more particularly to a method of laminating sheet materials by means of a bonding medium requiring the use of heat, or heat and pressure, to set the same.

In accordance with the principles of my present invention, a thermo-sensitive adhesive is disposed between the surfaces of the materials to be united and the bonding of such surfaces effected by utilizing the hydrostatic pressure, reenforced by an applied pressure, if desired; and the heat of a molten metal, or alloy. In the preferred form of my invention, the materials to be laminated are temporarily caused to adhere to each other through the medium of the thermo-sensitive adhesive, and are then enclosed in a flexible membrane and the membrane-enclosed materials immersed in a bath of a heated fluid, preferably a molten, low melting point alloy. Depending upon the depth to which the materials are submerged, the amount of hydrostatic pressure may be varied to suit the requirements of the particular adhesive used. Similarly, the bath of molten metal or alloy may be maintained at the temperature required for setting or curing the adhesive. Preferably, a solvent-free thermosetting adhesive is employed so as to eliminate the problem of providing for the escape of the solvent during the curing of the adhesive.

The method of my invention is particularly applicable to the laminating of a fabric, such as canvas, to wood, as in the manufacture of boats, and particularly collapsible boats. Where thermo-setting resins are used for this purpose, elaborate dies are required because of the varying contours of the forms that are to be laminated, and the cost of such dies adds materially to the cost of manufacture. In the case of my present method, however, the complexity of the contours of the forms to be laminated presents no problem, since the hydrostatic pressure at any point in the bath of molten metal is equal in all directions and therefore adapts itself to the contours of the forms.

It is therefore an important object of this invention to provide a method of laminating using a thermo-sensitive bonding medium, in accordance with which a bath of a heated fluid, such as a bath of molten metal, or alloy, is used to furnish the necessary heat and pressure to effect the lamination and setting or curing of the bonding medium.

It is a further important object of this invention to provide a method of laminating sheet material in which a bath of molten metal or alloy is utilized to apply pressure to the parts to be laminated and the heat of the bath is utilized in curing or setting the bonding medium.

Other and further important objects of this invention will be apparent from the disclosures in the specification and the accompanying drawings.

On the drawings:

Figure 1 is a broken vertical sectional view of a simple form of apparatus for use in carrying out the method of my invention, illustrating the lamination of a fabric, such as canvas, to wood sheets to provide a flexible hinge therebetween.

Figure 2 is a fragmentary sectional view of the completed hinge structure.

As shown on the drawings:

The reference numeral 10 indicates a vessel for containing a bath of a heated fluid, such as a molten metal or alloy, the bath being indicated by the reference numeral 11. Alloys that have been found suitable for this purpose are Wood's metal, 50% bismuth, 12.5% cadmium, 25% lead, 12.5% tin; anatomical alloy, 53.5% bismuth, 17% lead, 19% tin, and 10.5% mercury; and Lipowitz alloy, 50.1 bismuth, 10% cadmium, 26.6% lead, and 13.3% tin, all of which alloys contain bismuth, tin and lead. Wood's metal, for instance, has a melting point of around 71° C., and the other two alloys named have comparable melting points of around the boiling point of water or less.

The invention will be described in connection with the laminating of a fabric, such as canvas, to wood. In the case of collapsible boats, it is customary to apply a layer of canvas to the wood boards from which the boat is formed and to provide flexible hinges between successive boards out of the canvas itself.

The reference numeral 12 indicates a pair of wood boards or planks that may be of a length suitable for use in making a collapsible boat. Each of the boards 12 is provided with a beveled end 13, between which, as previously explained, a flexible hinge is to be formed of the fabric, such as canvas, indicated at 14, by the laminating method of my invention.

Initially, the planks 12, 12 are laid out side by side on a flat surface in a reverse position from that illustrated in Figure 2. The adhesive medium may be applied either to the surface of the planks to which the canvas 14 is to be applied, or the adhesive may be applied to the surface of the canvas, or to both surfaces, or a separate adhesive-impregnated sheet or film may be interposed between the surfaces of the planks and the canvas that are to be united. Preferably, an adhesive is used that possesses a sufficient initial tackiness to cause the canvas 14 to adhere slightly to the surfaces of the planks 12, 12. Various thermo-sensitive resinous compositions may be employed, such as the thermo-setting resins of the phenol-aldehyde type. A resorcinol formaldehyde resin composition has been found particularly suitable for use with canvas and wood. This resinous composition contains a catalyst that causes the composition to polymerize under the action of heat and form a hard, infusible, water repellant bond. No solvent is necessary with this particular resinous composition. Other solvent-free adhesives and resinous compositions of a thermo-sensitive character, whether thermosetting or thermoplastic, can be used. Rubber cements and others can also be used. In general, any adhesive that requires heat or the setting of which is speeded up by the application of heat, or by the application of heat and pressure, can be used for my purposes.

After the canvas 14 has been lightly united with the surfaces of the planks 12, 12, the uncovered surfaces of the planks are brought together, or nearly so, by swinging the planks about the hinge portion, indicated at 15 between the beveled ends 13 of the planks. With the planks in the position illustrated in Figure 1, the laminated assembly is inserted within a flexible membrane 16, which may be formed of rubber, either natural of synthetic, or of any other relatively thin, flexible material, such as paper, or like fibrous material that is resistant to the temperatures of the molten bath 11. The membrane 16 may be in the form of an envelope of the size and shape to receive the laminated assembly of the wood planks and canvas.

In order to force the enclosed assembly beneath the surface of the molten bath 11, a plunger 17 may be applied against the upper ends of the planks 12, 12 and the plunger lowered to immerse the assembly beneath the surface of the bath 11. The plunger 17 may have a downwardly extending web portion 18 that serves as a spacer for the planks 12, 12 and also as a guide for maintaining said assembly in a vertical position. The showing in Figure 1 is intended to be merely diagrammatic for the purpose of illustrating the method, but it will be understood that mechanical means can be used to depress the assembly to any depth within the bath 11 that is necessary to obtain the desired amount of pressure, and the bath may be maintained at whatever temperature is required to effect the setting or curing of the adhesive.

After the assembly has been held within the molten bath 11 for the required length of time to effect a cure or set of the adhesive, it is withdrawn and removed from the flexible envelope 16. The canvas 14 will then be found to be firmly and permanently united to the surfaces of the planks 12, 12, including the surfaces of the beveled ends 13. A sufficient width of canvas is provided between said beveled ends 13 to afford a flexible hinge at 15. In the case of a collapsible boat, the hinge 15 would serve to permit the planks 12, 12 to be folded upon themselves as illustrated in Figure 1, or folded to any desired extent depending upon the design of the collapsible boat.

If additional pressure were required above that provided by the hydrostatic pressure of the molten metal or alloy, fluid pressure could be superimposed upon the bath 11.

Alternatively, in the case of an alloy that expands upon freezing, as is the case with a lead-tin-bismuth eutectic having a composition: Bismuth, 51.6%; cadmium, 8.1%; lead, 40.2%, the pressure developed by the expansive force of the alloy on cooling could be utilized to provide higher laminating pressures. For instance, the bath 11 can be kept at a temperature only slightly above the melting point of the alloy, so that the cooling effect of the assembly to be laminated will lower the temperature of the bath sufficiently to cause solidification to take place. After the whole bath has solidified and the expansive forces created as a result thereof have acted to press the laminae together, the bath is heated to raise its temperature back above the solidification point and the assembly is removed.

It will be understood that under the pressures developed by the hydrostatic head of the molten alloy acting upon the outer surface of the enclosing diaphragm 16, the diaphragm and the membrane and the underlying fabric 14 will be pressed against the contour of the planks 12, 12 with a pressure that is equalized in every direction for the particular depth to which any given point may be submerged, with the result that smooth, firm adherence of the fabric 14 to the surfaces of the planks 12, 12 can be obtained regardless of the contour of the surface of said planks. This is an important feature of my invention, since it eliminates the necessity of having elaborately contoured dies, or plates, for the hot-pressing of special forms for effecting lamination thereof.

Although the plunger web portion 18 is shown as filling the space between the inner faces of the planks 12, 12 in Figure 1, it will be understood that canvas or other laminating material may be used to face the inner surfaces of the planks 12, 12 and be simultaneously bonded thereto in the same operation as has been described above.

Among the resins mentioned herein, one of the most satisfactory ones is Amberlite PR-115 in conjunction with Catalyst P-117 which latter is a formaldehyde liberating compound, both put out by The Resinous Products & Chemical Company of Philadelphia, Pennsylvania. This resin is described as a resorcinol resin and is available in liquid form. The catalyst is added with agitation and the liquid allowed to stand before use. Between 50 and 70 pounds of the liquid per 1000 square feet of joint should be used. Pressures of the order of 100 pounds per square inch are suitable with temperatures up to 190° F. and times of treatment at that temperature of about ten minutes or longer.

Amberlite PR-115 has a sufficient initial tackiness to effect a preliminary bond, but if the adhesive used does not possess sufficient tackiness initially to lightly bond the surfaces to be laminated, spot adherence may be secured by the use of a hot iron pressed against the canvas at various points, or the laminated assembly may be partially pre-cured by the use of radio high frequency waves, sometimes referred to as heatronics.

I claim as my invention:

1. The method of laminating materials, which comprises subjecting an assembly of the materials and a thermo-sensitive adhesive disposed therebetween to the hydrostatic pressure and to the heat of a mass of molten metal that expands upon solidifying, reducing the temperature of said mass to effect solidification of said metal, thereby causing the pressure created by the expansion of said metal to be exerted against said assembly, remelting said metal and removing said assembly.

2. The method of laminating material, which comprises disposing a thermosetting resinous composition between the materials to be laminated, enclosing said materials within a flexible membrane and immersing the membrane-enclosed materials in a bath of molten metal that expands upon solidifying, reducing the temperature of said molten metal to effect solidification of said metal, thereby subjecting the materials to the pressure of the expanding metal and to the heat of the mass of metal, remelting the metal and removing the assembly.

3. The method of laminating sheet materials which comprises disposing a solvent-free, thermo-sensitive resinous composition between the sheets to be laminated, immersing the materials in a bath of a molten alloy that expands upon solidifying, reducing the temperature of the bath to effect solidification of the alloy, thereby causing the pressure created by the expansion of the alloy and the heat of the bath to be exerted against the assembly, remelting the alloy and removing the assembly.

4. The method of laminating material which comprises disposing a solvent-free, thermo-sensitive resinous composition between the materials to be laminated, enclosing the materials within a flexible membrane, immersing the membrane-enclosed materials in a bath of a molten eutectic alloy that expands upon solidifying, reducing the temperature of the bath to effect solidification of the alloy, thereby causing the pressure created by the expansion of said alloy upon solidification and the heat of the alloy mass to be exerted against said assembly, remelting the solidified bath and removing the assembly.

TABER DE FOREST.

REFERENCES CITED

The following references are of record in the file of this patent:

UNITED STATES PATENTS

| Number | Name | Date |
| --- | --- | --- |
| 1,343,191 | Allcutt | June 15, 1920 |
| 1,377,517 | Novotny | May 10, 1921 |
| 1,475,623 | Egerton | Nov. 27, 1923 |
| 2,073,290 | Teague | Mar. 9, 1937 |
| 2,331,296 | Bendix | Oct. 12, 1943 |
| 2,423,647 | Gurvitch | July 8, 1947 |
| 2,431,050 | Kopplin | Nov. 18, 1947 |